UNITED STATES PATENT OFFICE.

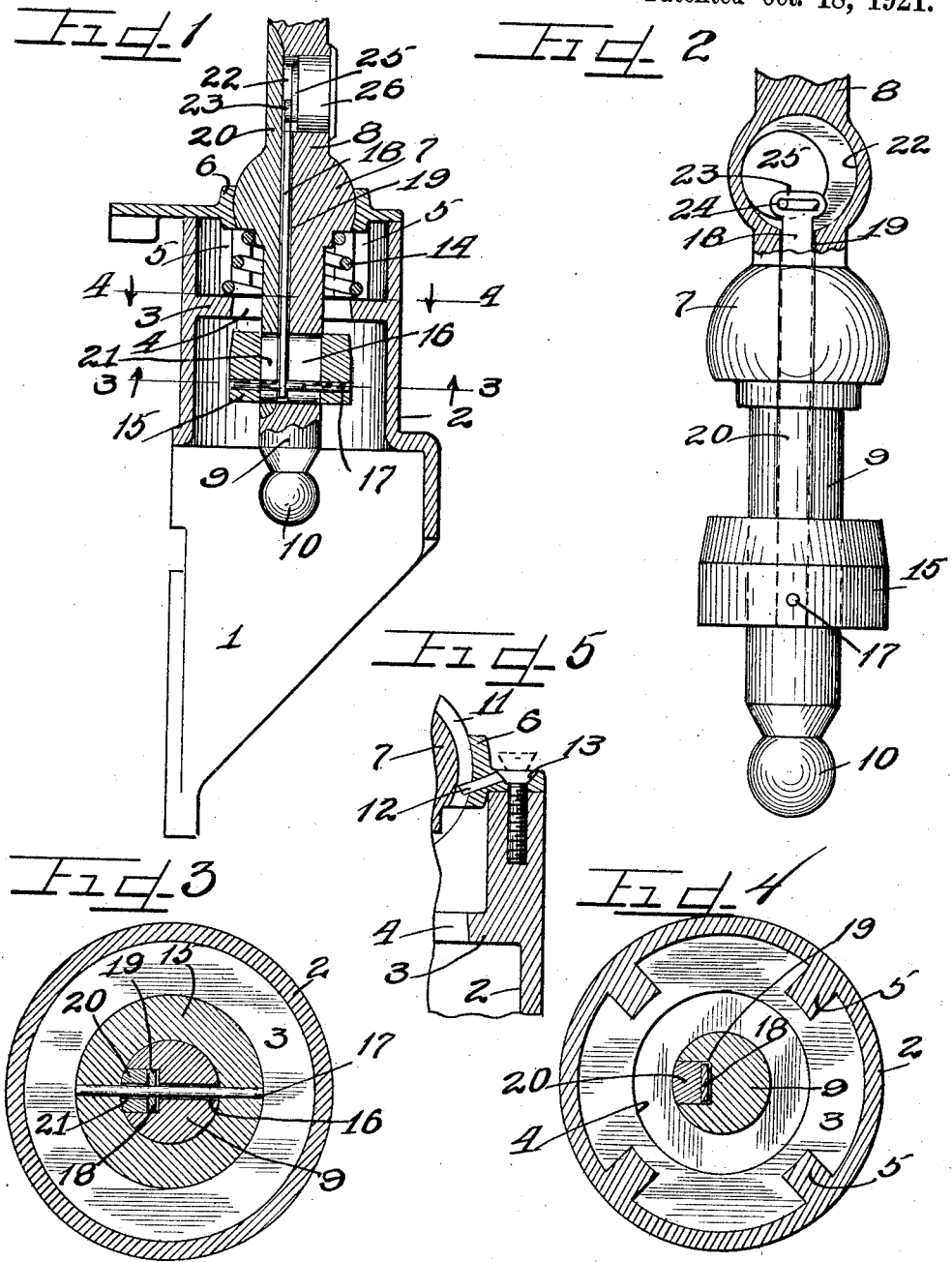

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

GEAR-SHIFT-LEVER LOCK.

1,394,258.  Specification of Letters Patent.  Patented Oct. 18, 1921.

Application filed January 27, 1919. Serial No. 273,381.

*To all whom it may concern:*

Be it known that I, COLVIN L. JOHNSON, a citizen of the United States, and a resident of the city of Chicago, in the county of Cook and State of Illinois, have invented certain new and useful Improvements in a Gear-Shift-Lever Lock; and I do hereby declare that the following is a full, clear, and exact description of the same, reference being had to the accompanying drawings, and to the numerals of reference marked thereon, which form a part of this specification.

This invention relates more particularly to an improved type of a gear shift lever lock, wherein a key operated slidable locking member engaged on the lower portion of a gear shift lever is adapted to be elevated to engage in an opening of a casing partition plate to hold the gear shift lever locked against movement.

It is an object of this invention to construct a gear shift lever lock having a locking member adapted to be lifted into locking position.

It is also an object of the invention to provide a gear shift lever lock wherein a locking block is adapted to be moved to engage the lever housing for holding the lever lock against movement.

A further object of this invention is the construction of a lever lock wherein the lever is adapted to be locked against movement by means of a slidable member adapted to be elevated to engage in an opening formed in the lever housing.

It is furthermore an object of the invention to provide a lock wherein a slotted gear shift lever has a pin projecting through the slot thereof to slidably support a locking member on the exterior of the lever to permit the locking member to be elevated into locking engagement with the lever casing by a pin lock mechanism disposed within the lever.

It is an important object of this invention to provide a gear shift lever lock of simple and effective construction wherein the lever housing is formed to permit a locking member on the gear shift lever to be raised to lockingly engage therewith to hold the lever locked against a shift movement.

Other and further important objects of the invention will be apparent from the disclosures in the drawings and specification.

The invention (in a preferred form) is illustrated in the drawings, and hereinafter more fully described.

On the drawings:

Figure 1 is a central vertical section through an automobile gear shift lever and housing, equipped with a lever locking mechanism embodying the principles of this invention.

Fig. 2 is an enlarged elevation of the lower portion of the gear shift lever and the lock, removed from the housing with the lever partly shown in section to disclose the upper part of the locking mechanism.

Fig. 3 is an enlarged section taken on line 3—3, of Fig. 1.

Fig. 4 is an enlarged section taken on line 4—4, of Fig. 1.

Fig. 5 is a fragmentary detail section through the ball and socket portion of the gear shift lever mechanism showing a locking arrangement preventing a rotary movement of the gear shift lever.

As shown on the drawings:

The reference numeral 1, indicates a portion of an automobile gear shift box having integrally formed on the top thereof a cylindrical casing or housing 2, open at its upper and lower ends. Integrally formed within the cylindrical housing 2, between the upper and lower ends thereof is a horizontal locking partition or locking plate 3, provided with a central tapered locking opening 4. Integrally formed on the inner surface of the housing wall above the partition 3, are a plurality of equidistantly spaced vertical ribs or flanges 5, which extend radially inward to within a short distance of the tapered opening 4.

Secured upon the top of the housing 2, is a socket or lever supporting member 6, which closes the upper end of the housing and also affords a socket for receiving the ball portion 7, of a gear shift lever 8. The lever 8, is formed with the lower portion thereof affording an integral tail 9, which projects downwardly through the opening 4, and through the housing 2, so that the ball end 10, thereof, is positioned within the gear shift box 1, to permit the same to be associated with the gear shift mechanisms, not shown. To prevent a rotary movement of the gear shift lever in the socket 6, the ball 7, of the lever is provided with a vertical groove or slot 11, into which projects the inner end of a locking or guide pin 12. The guide pin 12, is inclined downwardly, as shown in Fig. 5, and is engaged in a passage formed in the socket 6, for the purpose. A screw 13, is removably engaged through the socket flange and engages in a threaded passage in the upper part of the housing 2, to hold the guide pin locked in position. The pin 12, prevents a rotary movement of the gear shift lever, but permits forward, rearward and sidewise shifting of the lever. To hold the ball 7, in engagement with the socket 6, a heavy coiled spring 14, is disposed within the upper portion of the housing 2, with the lower portion of the spring seated upon the partition ring 3, and the upper end of the spring engaged against the flat lower-part of the ball 7. The flanges 5 serve as guides for holding the spring 14 in proper operating position.

Slidably mounted upon the tail portion 9, of the gear shift lever 8, is a locking collar, ring or block 15, centrally or axially passaged to receive the tail projected therethrough. The upper exterior portion of the locking collar 15, is tapered or beveled to permit the collar to project into the tapered locking opening 4, of the housing partition 3, to hold the lever locked against a shifting movement. Formed in the lever tail 9, below the partition 3, is a diametric slot 16, through which a pin or rod 17, projects. The ends of the pin 17, are secured in opposite sides of the locking collar 15. Engaged on the middle portion of the pin 17, is the lower apertured end of a long locking or latch bar 18, which is slidably engaged within a long passage 19, formed longitudinally in one side of the lever 8, and extending downwardly through the ball 7 and the tail 9, to a point slightly below the slot 16. As clearly shown in Fig. 1, the passage 19, which opens through one side of the lever, is closed by means of a suitably shaped retaining strip or closure bar 20, which is disposed in the outer part of the passage 19, and is secured to the lever by any suitable means to inclose the latch bar 18. The lower apertured end of the latch bar 18, projects into the lever slot 16, to permit the supporting pin 17, of the locking collar to project therethrough. To permit the locking collar 15, to be actuated by the latch bar 18, the retaining strip 20, is provided with a slot 21, which is adapted to register with the lever slot 16, as shown in Fig. 1.

Formed in the lever 8, above the ball portion 7, is a chamber 22, communicating with the upper end of the passage 19, and into which projects the upper end of the latch bar 18. Integrally formed on the upper end of the latch bar 18, is a slotted head 23, adapted to receive a lock pin 24, projected therethrough. The pin 24, is formed on a barrel 25, of a pin lock 26, which is mounted within the lever chamber 22, and is adapted to receive a key for rotating the lock barrel and operating the latch bar 18, and the locking collar engaged on the lower end thereof.

The operation is as follows:—

In the neutral position of the gear shift lever, it is disposed vertically in the housing 2, and is held against being rotated in the socket 6, by the pin 12, the inner end of which projects into the groove 11, formed in the ball 7. The guide pin 12, however, permits the lever to be shifted forward, backward and sidewise for the purpose of shifting the gears.

In the unlocked position of the gear shift lever 8, the lock pin 24, on the lock barrel 25, is in its lowermost position as shown in Fig. 2, with the pin 24 at one end of the slot in the latch bar head 23, thus holding the locking collar 15, in its lowermost position and free from engagement with the housing partition 3. To lock the gear shift lever 8, against a composite movement, it is first moved to neutral position, and by means of a key, inserted into the key hole of the pin lock 26, the barrel 25, is rotated, whereby the lock pin 24, is moved upwardly and at the same time slides to the other end of the slot in the latch bar head 23, thereby drawing the latch bar 18, upwardly. Raising of the latch bar causes the tapered locking collar or block 15, to be slidably elevated on the lever tail 9, the pin 17, sliding upwardly in the registering slots 16 and 21, so that the tapered upper portion of the locking collar engages in the tapered opening 4, of the housing partition 3, to hold the lever locked against a shifting movement, thus preventing theft of an automobile or other vehicle, equipped with such a lock, or interference with the gear shift mechanism thereof.

The device is unlocked by merely inserting the key in the lock 26, and rotating the barrel 25, in the opposite direction, whereby the lock pin 24, is moved downwardly to force the latch bar downwardly thus forcing the locking collar 15, out of engagement with the housing partition 3, into release position, as shown in Fig. 1.

I am aware many changes may be made, and numerous details of construction varied through a wide range without departing from the principles of this invention, and I therefore do not purpose limiting the patent granted, otherwise than necessitated by the prior art.

I claim as my invention:

1. In a gear shift lever lock of the class described the combination with a gear shift lever, of locking means therein, a locking plate, and means slidably mounted on said lever and connected with said locking means to be moved upwardly thereby into locking engagement with said plate to hold the lever locked against movement.

2. In a lock of the class described the combination with a gear shift lever, of locking means therein, a locking member slidable on the lever and connected with said locking means, and a stationary plate having an opening therein through which the lever projects, said locking means adapted to be actuated to elevate said locking member into a position to engage in said stationary plate opening to hold the lever locked against movement.

3. In a gear shift lever lock the combination with a stationary plate having an opening therein, a gear shift lever projecting through the opening in said plate, and locking means on said lever below said plate adapted to be elevated to engage in said opening to hold the lever in locked position.

4. In a gear shift lever lock the combination with a gear shift lever, of key-operated means therein, a locking member slidably mounted on said lever and connected with said key-operated means, a housing for supporting said lever, and a partition integrally formed therein having an opening through which said lever projects, said key-operated means adapted to be operated to elevate said locking member to engage in the partition opening to hold the lever locked against movement.

5. In a lock device of the class described adapted for use on an automobile the combination with a ball and socket gear shift lever, of a locking collar slidably mounted on the lower end of the lever below the ball theerof, key-operated mechanisms within said lever, said lever having a diametric slot in the lower portion thereof, means projecting through said slot and connected with said locking collar and with said key-operated mechanisms, a housing inclosing the lower portion of the lever, and a partition plate integrally formed in said housing having an opening therein through which said lever projects, said key-operated mechanisms adapted to be actuated to elevate said locking collar on said lever into a position to engage in the opening in said partition plate to hold the lever locked against movement.

6. In a lock of the class described the combination with a gear shift lever having a transverse slot and a longitudinal passage therein communicating with one another, stationary means having an opening therein through which the lower end of the lever projects, a locking member slidably engaged on the lower end of said lever, a latch bar movably disposed in the lever passage, means connecting said latch bar to said locking member, and key-operated means in said lever connected with said latch bar and adpated to actuate the same to elevate the locking member into a position to engage in the opening in said stationary means to hold the lever locked against movement.

7. In a lock of the class described the combination with a gear shift lever and the housing thereof, of locking means slidably mounted on said lever adapted to be elevated on said lever to engage said housing to hold the lever locked against movement.

8. In a lock of the class described the combination with a gear shift lever and the housing thereof, of a horizontal plate integrally formed in said housing and having a tapered opening therein, a tapered locking member slidably mounted on the lower end of the lever below said plate, and means for moving said locking member upwardly on said lever to engage in the opening in said plate to hold the lever locked against movement.

9. The combination with a gear shift lever and the supporting housing thereof, of a locking member slidably engaged on said lever below the point of pivotal connection thereof and adapted to be elevated to engage said housing to hold the lever locked against movement.

In testimony whereof I have hereunto subscribed my name in the presence of two subscribing witnesses.

COLVIN L. JOHNSON.

Witnesses:
 EARL M. HARDINE,
 CHARLES W. HILL, Jr.